UNITED STATES PATENT OFFICE.

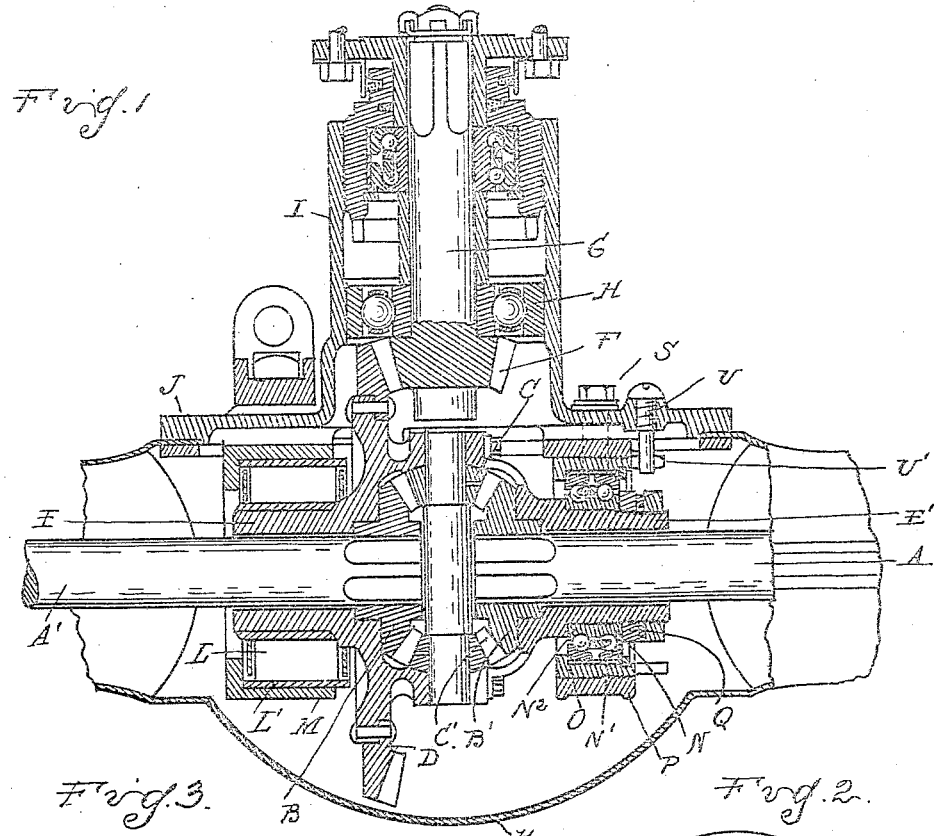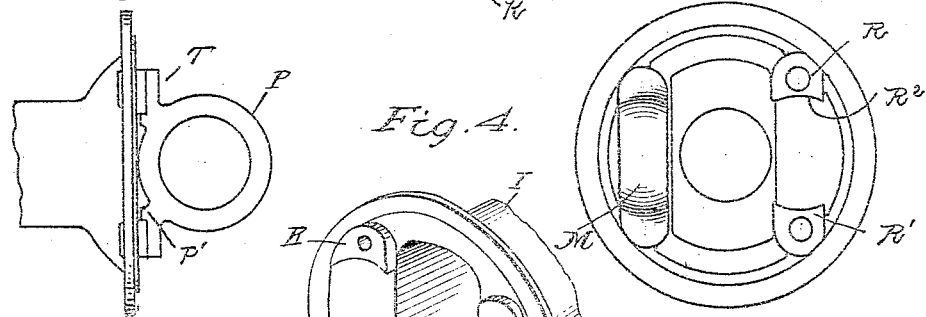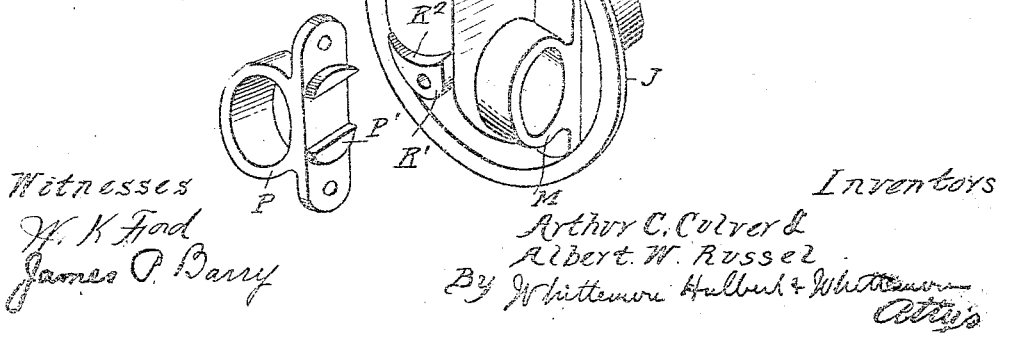

ARTHUR C. CULVER AND ALBERT W. RUSSEL, OF DETROIT, MICHIGAN, ASSIGNORS TO RUSSEL MOTOR AXLE COMPANY, OF DETROIT, MICHIGAN, A CORPORATION OF MICHIGAN.

DRIVE-AXLE CONSTRUCTION FOR MOTOR-VEHICLES.

1,159,652.  Specification of Letters Patent.  Patented Nov. 9, 1915.

Application filed June 16, 1913. Serial No. 774,031.

*To all whom it may concern:*

Be it known that we, ARTHUR C. CULVER and ALBERT W. RUSSEL, citizens of the United States of America, residing at Detroit, in the county of Wayne and State of Michigan, have invented certain new and useful Improvements in Drive-Axle Construction for Motor-Vehicles, of which the following is a specification, reference being had therein to the accompanying drawings.

The invention relates to drive axle constructions for motor vehicles, and has more particular reference to the construction of the differential gearing and manner of mounting the same in the axle housing as hereinafter set forth.

In the drawings: Figure 1 is a horizontal section through a portion of a drive axle for motor vehicles to which our improvements are applied; Fig. 2 is an elevation of the cover plate for the differential gear viewed from the inside; and Fig. 3 is an elevation thereof at right angles to Fig. 2. Fig. 4 is a perspective view of the cap member viewed from the inside with the detachable bracket.

In the construction of drive axles it is usual to arrange the differential gearing at the center and to inclose the same in an enlargement of the axle housing. This gearing includes the bevel gears which transmit the power from the longitudinal drive shaft, and it is therefore necessary to provide bearings which take care of both radial and end thrust and permit of adjustment and detachment of the parts for repairs. It is usual to provide bearings upon opposite sides of the differential, each of which includes a radial thrust and end thrust portion. With the present invention we have simplified the construction and facilitated assembly of the parts by placing a bearing for radial thrust only on the side of the differential adjacent to the bevel gear wheel, and a bearing for end thrust in both directions upon the opposite side of the differential. The latter bearing will also take care of a small amount of radial thrust, but as the heaviest radial load is immediately adjacent the bevel gear wheel, the bearing in proximity thereto will receive the principal stress.

As shown, A and A' are alined sections of the axle, which at their inner ends are square to engage the bevel pinions B and B' of the differential, between which are the bevel pinions C and C' mounted on the bevel gear wheel D. This bevel gear wheel is formed with a hub portion E on the side immediately adjacent thereto, and a corresponding hub portion E' is arranged upon the opposite side of the gearing, and together with the gear D forms the supporting bearings for the pinion C. F is a bevel pinion meshing with the gear wheel D, which is mounted upon the longitudinal transmission shaft G journaled in bearings H in a housing I formed integral with a cap J for the axle housing K.

For supporting the axle and the differential gearing within the housing K a radial thrust bearing L is arranged to engage the hub E on the side adjacent to the gear wheel D. This, as shown, is a parallel roller bearing engaging an annular race member L' secured in a bracket member M mounted upon the cap member J. On the opposite side an end thrust bearing N engages the hub E', and which, as shown, comprises a ball bearing having the race member N' secured to the adjustable sleeve O, which has a threaded engagement with a bracket member P secured to the cap member. The coöperating race member $N^2$ of the bearing is clamped to the hub E' by lock nuts Q, so that longitudinal adjustment of the sleeve O will shift the entire differential assembly, and will permit of adjusting the gear wheel D in relation to the pinion F.

The brackets M and P are mounted upon the cap member J, and to permit of assembly of the differential at least one of these brackets must be detachable. As shown, the bracket M is integral with the cap member and the bracket P is detachably secured thereto. It is necessary to properly aline the bracket P with the bracket M, as well as to hold it in an exact position, secured against longitudinal and lateral movement and properly spaced from the bracket M. This we have accomplished in a simple manner by forming upon the cap member J bearing lugs R and R' for the bracket P, which lugs are faced on their inner sides to circular segments $R^2$ concentric with the center of the bearing N. The bracket P is provided with complementary segments P' also concentric with the center of the bearing, and thus when the parts are assembled the center of the bearing N will be spaced a fixed distance from the center of the bearing L, while at the same time said bearing N is free to be rotatively adjusted into true axial alinement with the bearing L by rocking the segments P' of the bracket P in contact with the surfaces R² of the lugs R and R'. The bracket P may then be secured in position by bolts S passing through the lugs R and R' and ears T on the bracket, as shown.

With the construction as shown in operation, the maximum portion of the radial load on the axle is borne by the radial thrust bearing L, a relatively small portion of the radial thrust being carried by the bearing N. On the other hand, all of the end thrust in both directions is carried by the bearing N, and adjustment may be made by rotating the threaded sleeve O, which may then be locked by a set screw U engaging notches U' in the flange. In assembling the parts, the bracket P is placed in position, after the axle and differential gearing have first been positioned, and by reason of the coöperating circular segmental bearings R² and P', said bracket will automatically adjust itself to aline the bearing N. The bolts S are then tightened and will hold the parts in this position.

What we claim as our invention is:

1. In a drive axle, the combination with the housing of a differential gearing therein, including a bevel gear wheel on one side thereof, a bearing for said differential gearing arranged on the side adjacent to the central plane of said bevel gear and adapted for radial thrust, and a bearing adjacent the opposite side of said differential gearing adapted for end thrust.

2. In a drive axle, the combination with a housing, of a differential gearing therein, a cap for said housing, brackets projecting inwardly from said cap upon opposite sides of said differential gearing, a bearing for radial thrust secured in one of said brackets and supporting said gearing, and a bearing for end thrust in both directions engaging the other of said brackets and longitudinally adjustable therein.

3. In a drive axle, the combination with a housing, of a differential gearing therein, a cap for said housing, brackets projecting inward from said cap upon opposite sides of said gearing, one of said brackets being fixed in relation to said cap, a segmental bearing for the other of said brackets upon said cap member concentric with an axis perpendicular to the axis of said axle, bearings in said brackets for said differential adapted to be alined by the rotative adjustment of said bracket having the segmental bearing, and clamping means for said bracket.

4. In a drive axle, the combination with a housing, of a differential gearing therein, a cap for said housing, a transmission shaft perpendicular to the axle journaled in said cap, annular brackets projecting inward from said cap upon opposite sides of said differential and concentric therewith, bearings for said differential secured in said brackets, and means for securing one of said brackets at a fixed distance from the other of said brackets, permitting of rotative adjustment about an axis perpendicular to that of the axle for alining said bearings.

5. In a drive axle, the combination with the housing, of a differential gearing therein, a cap for said housing, annular brackets projecting inward from said cap on opposite sides of said gearing and concentric therewith, one of said brackets being integral with the cap, a radial thrust bearing secured in said integral bracket, a bearing adapted for end thrust in the opposite bracket, means for securing the latter bracket permitting a swivel adjustment thereof to aline the bearing with the bearing in the opposite bracket, and means for longitudinally adjusting said thrust bearing in its bracket.

6. In a drive axle the combination with the housing, of a differential gearing therein including a bevel gear wheel on one side thereof, a bearing for said differential gearing arranged on the side adjacent but in close proximity to the central plane of said bevel gear and adapted for radial thrust, and a bearing adjacent the opposite side of said differential gearing adapted for end thrust.

In testimony whereof we affix our signatures in presence of two witnesses.

ARTHUR C. CULVER.
ALBERT W. RUSSEL.

Witnesses:
M. CURRIE,
W. A. SMITH.